(12) United States Patent
Kikuchi

(10) Patent No.: US 10,469,170 B2
(45) Date of Patent: Nov. 5, 2019

(54) OPTICAL TRANSCEIVER, OPTICAL TRANSMITTER IC, AND OPTICAL RECEIVER IC

(71) Applicant: Oclaro Japan, Inc., Kanagawa (JP)

(72) Inventor: Nobuhiko Kikuchi, Tokyo (JP)

(73) Assignee: Lumentum Japan, Inc., Kanagawa (JP)

( * ) Notice: Subject to any disclaimer, the term of this patent is extended or adjusted under 35 U.S.C. 154(b) by 0 days.

(21) Appl. No.: 15/660,263

(22) Filed: Jul. 26, 2017

(65) Prior Publication Data

US 2018/0034549 A1 Feb. 1, 2018

(30) Foreign Application Priority Data

Aug. 1, 2016 (JP) .................................. 2016-151300

(51) Int. Cl.
*H04B 10/40* (2013.01)
*H04B 10/50* (2013.01)
*H04B 10/69* (2013.01)

(52) U.S. Cl.
CPC ........... *H04B 10/40* (2013.01); *H04B 10/503* (2013.01); *H04B 10/69* (2013.01); *H04B 10/697* (2013.01)

(58) Field of Classification Search
CPC .... H04B 10/697; H04B 10/69; H04B 10/503; H04B 10/40
USPC ................................. 398/135–139, 182–214
See application file for complete search history.

(56) References Cited

U.S. PATENT DOCUMENTS

| 4,267,590 A | * | 5/1981 | Bosotti | H04B 10/2503 398/154 |
| 4,427,895 A | * | 1/1984 | Eng | H04J 14/08 250/551 |
| 4,959,826 A | * | 9/1990 | Smith | H04B 1/69 375/E1.001 |
| 5,703,708 A | * | 12/1997 | Das | G02B 6/2861 250/227.12 |
| 6,619,867 B1 | * | 9/2003 | Asahi | H04B 10/506 398/102 |
| 7,136,593 B1 | * | 11/2006 | Yano | H04J 14/02 398/158 |

(Continued)

OTHER PUBLICATIONS

C. Xia et al., "Nonlinear Electrical Equalization for Different ModulationFormats With Optical Filtering," IEEE Journal of Lightwave Technology, vol. 25, No. 4, Apr. 2007, pp. 996-1001.

(Continued)

*Primary Examiner* — Dibson J Sanchez
(74) *Attorney, Agent, or Firm* — Mattingly & Malur, PC

(57) ABSTRACT

Provided are an optical transceiver, an optical transmitter IC, and an optical receiver IC, which can be applied to both a case of coding an optical signal and a case of decoding an optical signal, and can suppress an influence of waveform degradation with an inexpensive circuit. The optical transceiver includes an optical transmitter, an optical receiver, and at least any one of: a first delay circuit included in the optical transmitter and configured to delay an input first multi-level digital signal by a delay time corresponding to an amplitude level of the first multi-level digital signal; and a second delay circuit included in the optical receiver and configured to delay an input second multi-level digital signal by a delay time corresponding to an amplitude level of the second multi-level digital signal.

6 Claims, 17 Drawing Sheets

(56) References Cited

U.S. PATENT DOCUMENTS

| | | | | |
|---|---|---|---|---|
| 7,155,128 | B2* | 12/2006 | Roberts | H04B 10/2563 398/79 |
| 7,209,671 | B1* | 4/2007 | Hayee | H04L 25/061 398/207 |
| 7,277,644 | B2* | 10/2007 | Johnson | H03M 13/1515 398/118 |
| 7,343,101 | B1* | 3/2008 | Frankel | H04B 10/2543 398/158 |
| 9,036,751 | B1* | 5/2015 | Wang | H04L 25/03 375/350 |
| 9,106,051 | B1* | 8/2015 | Goodno | H01S 3/2391 |
| 9,237,047 | B1* | 1/2016 | Zhang | H04L 25/061 |
| 9,337,934 | B1* | 5/2016 | Agazzi | H04B 10/40 |
| 9,548,858 | B1* | 1/2017 | Cirit | H04L 27/02 |
| 9,742,550 | B1* | 8/2017 | Lugthart | H04L 7/033 |
| 2005/0169319 | A1* | 8/2005 | Mohamadi | H04L 25/14 370/514 |
| 2007/0212079 | A1* | 9/2007 | Ooi | H04B 10/505 398/198 |
| 2009/0074407 | A1* | 3/2009 | Hornbuckle | H04B 10/532 398/43 |
| 2009/0243682 | A1* | 10/2009 | Huang | H04L 25/0272 327/170 |
| 2010/0080570 | A1* | 4/2010 | Conroy | H04B 10/5057 398/154 |
| 2010/0178065 | A1* | 7/2010 | Nishihara | H04B 10/61 398/202 |
| 2010/0209121 | A1* | 8/2010 | Tanimura | H04B 10/611 398/202 |
| 2012/0155527 | A1* | 6/2012 | Gruendler | H04B 3/30 375/226 |
| 2012/0263456 | A1* | 10/2012 | Tanaka | H04B 10/5055 398/25 |
| 2014/0233084 | A1* | 8/2014 | Ono | G02F 1/01 359/279 |
| 2014/0321864 | A1* | 10/2014 | Bliss | H04B 10/541 398/186 |
| 2015/0071642 | A1* | 3/2015 | Tanaka | H04B 10/2575 398/115 |
| 2015/0071651 | A1* | 3/2015 | Asmanis | H04B 10/524 398/141 |
| 2015/0071653 | A1* | 3/2015 | Robinson | H04B 10/2507 398/161 |
| 2016/0043739 | A1* | 2/2016 | Taylor | G06F 11/10 714/776 |
| 2016/0094295 | A1* | 3/2016 | Doany | H04B 10/508 398/193 |
| 2016/0191161 | A1* | 6/2016 | Zhang | H04B 10/503 398/194 |
| 2016/0248521 | A1* | 8/2016 | Streshinsky | G02B 6/4266 |
| 2017/0099101 | A1* | 4/2017 | Pepper | H04B 10/801 |
| 2017/0310400 | A1* | 10/2017 | Nagarajan | H03M 1/682 |
| 2018/0083707 | A1* | 3/2018 | Fan | H04B 10/40 |
| 2018/0262373 | A1* | 9/2018 | Shibasaki | H04L 25/063 |

OTHER PUBLICATIONS

A. S. Karar et al., "Electronic Pre-Compensation for a 10.7-Gb/s SystemEmploying a Directly Modulated Laser", IEEE Journal of Lightwave Technology, vol. 29, No. 13, Jul. 1, 2011, pp. 2069-2076.

* cited by examiner (a) y(49,j)

(b) y(39,j)

OPTICAL TRANSCEIVER, OPTICAL TRANSMITTER IC, AND OPTICAL RECEIVER IC

CROSS-REFERENCE TO RELATED APPLICATION

The present application claims priority from Japanese application JP 2016-151300, filed on Aug. 1, 2016, the content of which is hereby incorporated by reference into this application.

BACKGROUND OF THE INVENTION

1. Field of the Invention

The present invention relates to an optical transceiver, an optical transmitter IC, and an optical receiver IC.

2. Description of the Related Art

In regard to optical fiber transmission over a relatively short transmission distance of from about 100 m to about 10 km, specifications obtained by increasing a transmission capacity from 100 GbE for related arts four-fold to 400 GbE are being standardized as a next-generation optical communication standard. As an optical transceiver configured to transmit/receive an optical signal, intensity modulation and direct detection may be employed, and an optical signal level may be increased from a binary level of a related art to a quaternary level, to thereby increase an amount of information that can be transmitted during one modulation period (symbol).

In C. Xia et al., "Nonlinear Electrical Equalization for Different Modulation Formats With Optical Filtering," IEEE J. Lightwave Technol., Vol. 25, No. 4, 2007, pp. 996-1001 (hereinafter referred to as "C. Xia"), there is disclosed a method of providing a non-linear adaptive Volterra equalizer to an optical receiver as a method for suppressing waveform degradation caused by direct modulation of a semiconductor laser.

In A. S. Karar et al., "Electronic Pre-Compensation for a 10.7-Gb/s System Employing a Directly Modulated Laser" IEEE J. Lightwave Technol., Vol. 29, No. 13, 2011, pp. 2069-2076 (hereinafter referred to as "A. S. Karar"), there is disclosed a method of providing a pre-distortion circuit to an optical transmitter as a method for suppressing waveform degradation caused by the direct modulation of the semiconductor laser.

SUMMARY OF THE INVENTION

It is known that, in a case where the optical signal level is set to a multi-level, for example, a quaternary level, large waveform degradation occurs when an extinction ratio is increased. The technology disclosed in C. Xia is advantageous in the capability of being applied to a direct-modulation semiconductor laser even when details of characteristics of the direct-modulation semiconductor laser are unknown, while convergence property of the non-linear adaptive Volterra equalizer is not necessarily guaranteed, and there is a fear that much time may be required for convergence or that an operation may become unstable. Further, a waveform distortion of the direct-modulation semiconductor laser is a non-linear effect over from two to three symbol periods, and compensation of the waveform distortion requires a large-scale circuit. This causes concern that the circuit may become more complicated or that its power consumption may increase. Further, a correction coefficient for the non-linear adaptive Volterra equalizer is determined through use of feedback received from the optical receiver, which imposes a restriction that the non-linear adaptive Volterra equalizer cannot be arranged in the optical transmitter.

The technology disclosed in A. S. Karar is a technology for calculating a solution to an equation for defining the operation of the semiconductor laser in advance and correcting a waveform of a modulation signal to be input to the semiconductor laser so as to obtain a desired modulation waveform, and is advantageous in that a calculation amount and power consumption during the operation can be reduced to obtain a satisfactory waveform compensation effect. Meanwhile, costs increase due to the need to approximately double a normal sampling rate of a DA converter provided to the optical transmitter in order to improve waveform compensation accuracy and the need to prepare a precise model of the semiconductor laser for the calculation of the correction in advance. This imposes a restriction that the technology cannot be arranged in the optical transmitter.

Therefore, the present invention has an object to provide an optical transceiver, an optical transmitter IC, and an optical receiver IC, which can be applied to both a case of coding an optical signal and a case of decoding an optical signal and can suppress an influence of waveform degradation with an inexpensive circuit.

(1) In order to solve the above-mentioned problems, according to one embodiment of the present invention, there is provided an optical transceiver including: an optical transmitter including: a multi-level encoder configured to output a first multi-level digital signal based on an input first information signal; a DA converter configured to convert the first multi-level digital signal into a first electric signal; and a semiconductor laser configured to output an optical signal having a modulated light intensity based on the first electric signal; an optical receiver including: an optical detector configured to receive the optical signal, and to output a second electric signal; an AD converter configured to convert the second electric signal into a second multi-level digital signal; and a multi-level decoder configured to decode the second multi-level digital signal, and to output a second information signal; and at least any one of: a first delay circuit included in the optical transmitter and configured to delay the input first multi-level digital signal by a delay time corresponding to an amplitude level of the first multi-level digital signal; and a second delay circuit included in the optical receiver and configured to delay the input second multi-level digital signal by a delay time corresponding to an amplitude level of the second multi-level digital signal.

(2) In the optical transceiver according to Item (1): the optical receiver includes the second delay circuit; and the multi-level decoder is configured to decode the second multi-level digital signal delayed by the second delay circuit, and to output the second information signal.

(3) In the optical transceiver according to Item (2), the optical receiver further includes: an error ratio detection unit configured to detect an error ratio of the second information signal output from the multi-level decoder; and a delay time correction unit configured to correct the delay time of the second delay circuit based on the error ratio.

(4) In the optical transceiver according to Item (1): the optical transmitter includes the first delay circuit; and the DA converter is configured to convert the first multi-level digital signal delayed by the first delay circuit into the first electric signal.

(5) In the optical transceiver according to Item (4), the optical transmitter further includes: a modulation condition setting unit configured to set a modulation condition for the semiconductor laser; and a delay time correction unit configured to correct the delay time of the first delay circuit based on the modulation condition.

(6) In the optical transceiver according to Item (1): the first delay circuit is configured to delay the input first multi-level digital signal by a delay time linearly depending on the amplitude level of the first multi-level digital signal; and the second delay circuit is configured to delay the input second multi-level digital signal by a delay time linearly depending on the amplitude level of the second multi-level digital signal.

(7) In the optical transceiver according to Item (1): the first delay circuit is configured to delay the input first multi-level digital signal by a delay time non-linearly depending on the amplitude level of the first multi-level digital signal; and the second delay circuit is configured to delay the input second multi-level digital signal by a delay time non-linearly depending on the amplitude level of the second multi-level digital signal.

(8) In the optical transceiver according to Item (7): the first delay circuit is configured to delay the input first multi-level digital signal by a delay time proportional to a reciprocal of a relaxation oscillation frequency of the semiconductor laser based on the amplitude level of the first multi-level digital signal; and the second delay circuit is configured to delay the input second multi-level digital signal by the delay time proportional to the reciprocal of the relaxation oscillation frequency of the semiconductor laser based on the amplitude level of the second multi-level digital signal.

(9) In the optical transceiver according to Item (1): the first delay circuit includes: a first response waveform output unit configured to output a response waveform with a waveform corresponding to the amplitude level of the input first multi-level digital signal; and a first delay and add circuit configured to successively delay-add a plurality of first response waveforms continuously output from the first response waveform output unit; and the second delay circuit includes: a second response waveform output unit configured to output a response waveform with a waveform corresponding to the amplitude level of the input second-multi-level digital signal; and a second delay and add circuit configured to successively delay-add a plurality of second response waveforms continuously output from the second response waveform output unit.

(10) In order to solve the above-mentioned problems, according to one embodiment of the present invention, there is provided an optical transmitter IC including: a multi-level encoder configured to output a first multi-level digital signal based on an input first information signal; a first delay circuit configured to delay the input first multi-level digital signal by a delay time corresponding to an amplitude level of the first multi-level digital signal; and a DA converter configured to convert the first multi-level digital signal delayed by the first delay circuit into a first electric signal, and to output the first electric signal to a semiconductor laser configured to output an optical signal having a modulated light intensity based on the first electric signal.

(11) In order to solve the above-mentioned problems, according to one embodiment of the present invention, there is provided an optical receiver IC including: an AD converter configured to receive input of a second electric signal from an optical detector that has received an optical signal, and to convert the second electric signal into a secondmulti-level digital signal; a second delay circuit configured to delay the input second multi-level digital signal by a delay time corresponding to an amplitude level of the second multi-level digital signal; and a multi-level decoder configured to decode the second multi-level digital signal delayed by the second delay circuit, and to output a second information signal.

According to the present invention, there are provided the optical transceiver, the optical transmitter IC, and the optical receiver IC, which can suppress the influence of waveform degradation with the technology which can be applied to both the case of coding an optical multi-level modulation signal and the case of decoding an optical multi-level modulation signal.

DETAILED DESCRIPTION OF THE INVENTION

Figure 1:
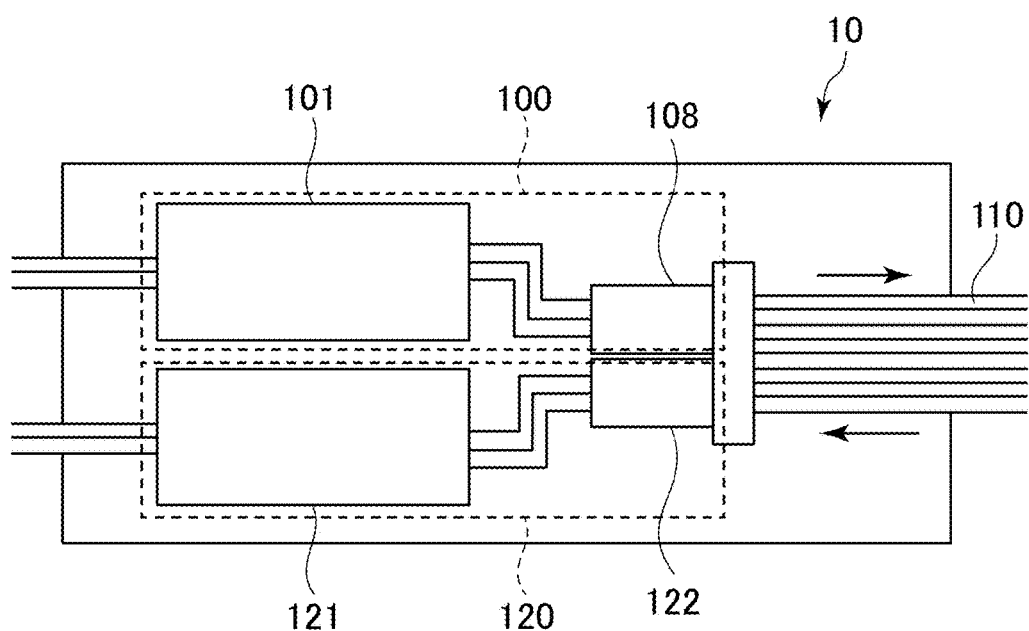
FIG. 1 is a top view of an optical transceiver according to an embodiment of the present invention.

An embodiment of the present invention is specifically described in detail in the following with reference to the drawings. Throughout the figures for illustrating the embodiment, like reference numerals are used to represent members having like functions, and repeated description thereof is omitted. The drawings referred to in the following are only for illustrating the embodiment by way of examples, and the sizes in the drawings do not always match with the scale in the embodiment.

FIG. 1 is a top view of an optical transceiver 10 according to the embodiment of the present invention. The optical transceiver 10 includes an optical transmitter 100, an optical receiver 120, and optical fibers 110. The optical transmitter 100 includes an optical transmitter IC (Integrated Circuit) 101 configured to receive input of a first information signal from the outside and to output a first electric signal, and a semiconductor laser 108 configured to output an optical signal having a modulated light intensity based on the first electric signal. The optical receiver 120 includes an optical detector 122 configured to receive an optical signal and to output a second electric signal, and an optical receiver IC 121 configured to decode the second electric signal and to output a second information signal to the outside. The optical fibers 110 are transmission lines for the optical signals, and are connected to the outside of the optical transceiver 10.

The optical transceiver 10 according to this embodiment includes at least anyone of: a first delay circuit 130 configured to delay an input first multi-level digital signal by a delay time corresponding to an amplitude level of the first multi-level digital signal, which is included in the optical transmitter 100; and a second delay circuit 131 configured to delay an input second multi-level digital signal by a delay time corresponding to an amplitude level of the second multi-level digital signal, which is included in the optical receiver 120. In the following description, a case where the optical receiver 120 includes the second delay circuit 131 is first described in detail. Then, a case where the optical transmitter 100 includes the first delay circuit 130 is described in detail. As described below, the first delay circuit 130 and the second delay circuit 131 have the similar configuration, and the technical ideas of the present invention can be applied to both the case of coding the optical signal (case of providing the first delay circuit 130 to the optical transmitter 100) and the case of decoding the optical signal (case of providing the second delay circuit 131 to the optical receiver 120).

Figure 2:
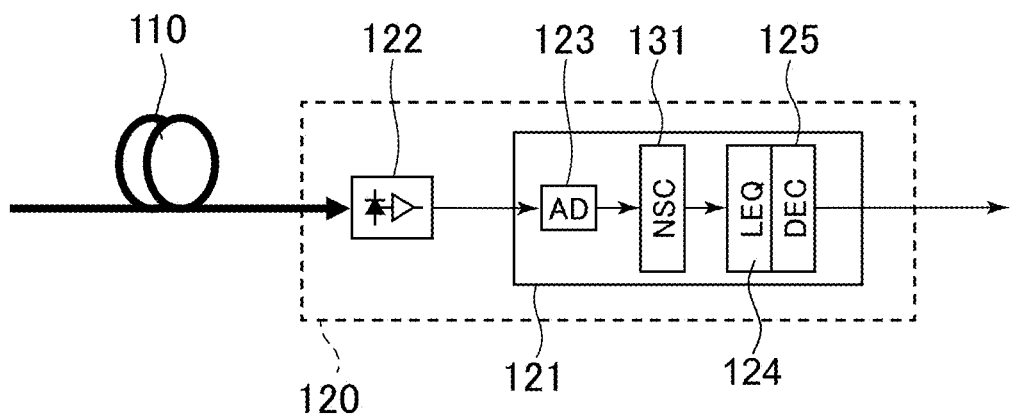
FIG. 2 is a functional block diagram of an optical receiver according to the embodiment of the present invention.

FIG. 2 is a functional block diagram of the optical receiver 120 according to the embodiment of the present invention. The optical receiver 120 includes the optical detector 122 configured to receive the optical signal transmitted by the optical fiber 110 and to output the second electric signal, and the optical receiver IC 121 configured to receive input of the second electric signal from the optical detector 122 that has received the optical signal. The optical receiver IC 121 includes an analog-to-digital (AD) converter 123 configured to convert the second electric signal into the secondmulti-level digital signal, the second delay circuit 131 configured to delay the input second multi-level digital signal by the delay time corresponding to the amplitude level of the second multi-level digital signal, and a multi-level decoder 125 configured to decode the second multi-level digital signal and to output the second information signal. The optical receiver IC 121 further includes a receiving-side linear equalizer 124. The receiving-side linear equalizer 124 is configured to receive input of the second multi-level digital signal delayed by the second delay circuit 131, and to correct linear deterioration ascribable to a high-frequency component, for example, the optical detector 122, thereby outputting the second multi-level digital signal to the multi-level decoder 125.

Figure 3:
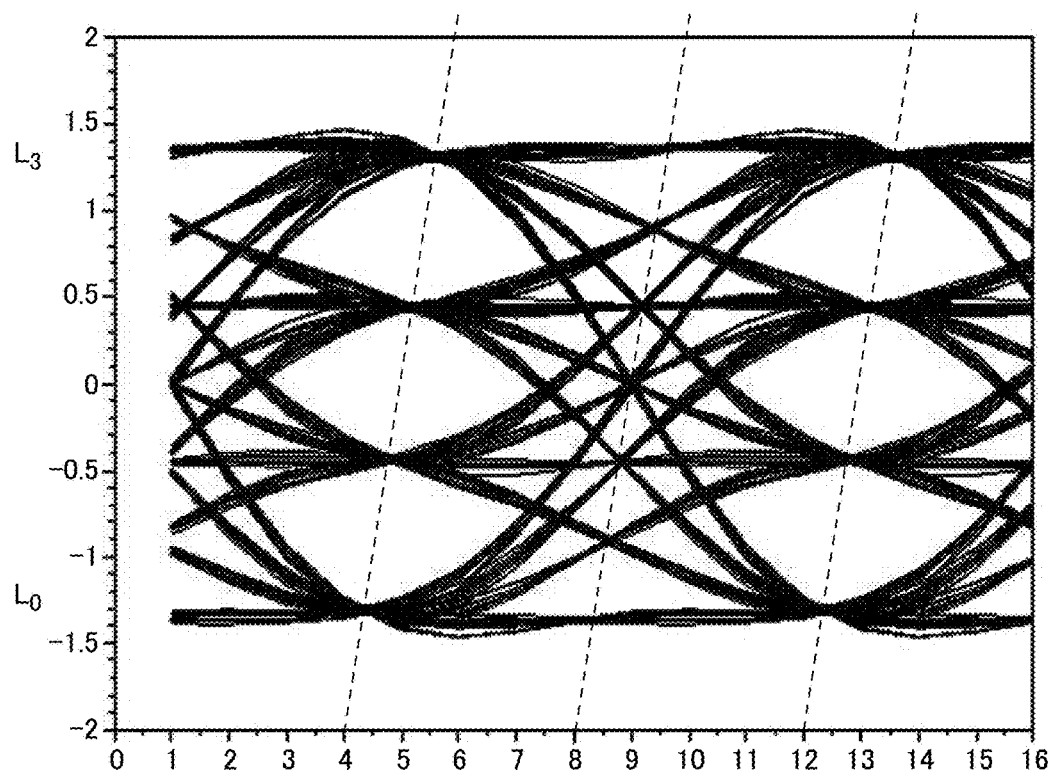
FIG. 3 is an example of a delay of an optical signal caused by a second delay circuit.

FIG. 3 is an example of a delay of the optical signal caused by the second delay circuit 131. The vertical axis of FIG. 3 indicates an intensity of the optical signal, L0 represents the lowest level of a quaternary optical signal, and L3 represents the highest level of the quaternary optical signal. The horizontal axis of FIG. 3 indicates a time. The second delay circuit 131 is configured to delay the input second digital signal by the delay time linearly depending on the amplitude level of the second digital signal. In FIG. 3, a deviation between peak positions of the quaternary optical signal is indicated by the broken line.

In the example illustrated in FIG. 3, the delay time of the waveform is set to a range from −10% to +10%. In the example illustrated in FIG. 3, the delay time is set so as to become linearly larger as the intensity of the optical signal becomes larger from L0 to L3. A shape of the waveform may change depending on characteristics of the optical detector 122 or the like, and in that case, the delay time may be changed appropriately.

Figure 4:
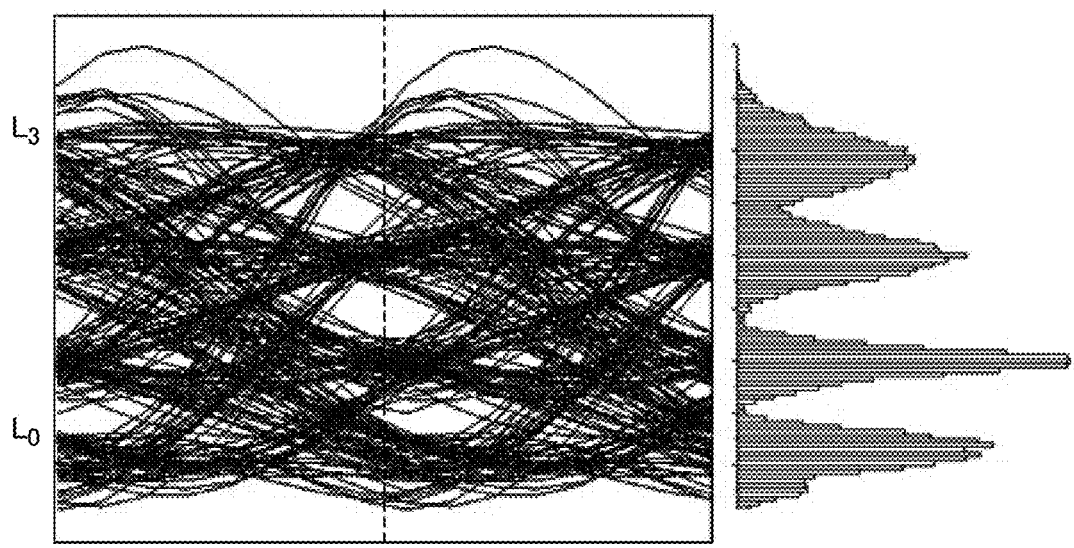
FIG. 4 is an example of how the optical signal is received when the delay is not caused by the second delay circuit.
Figure 5:
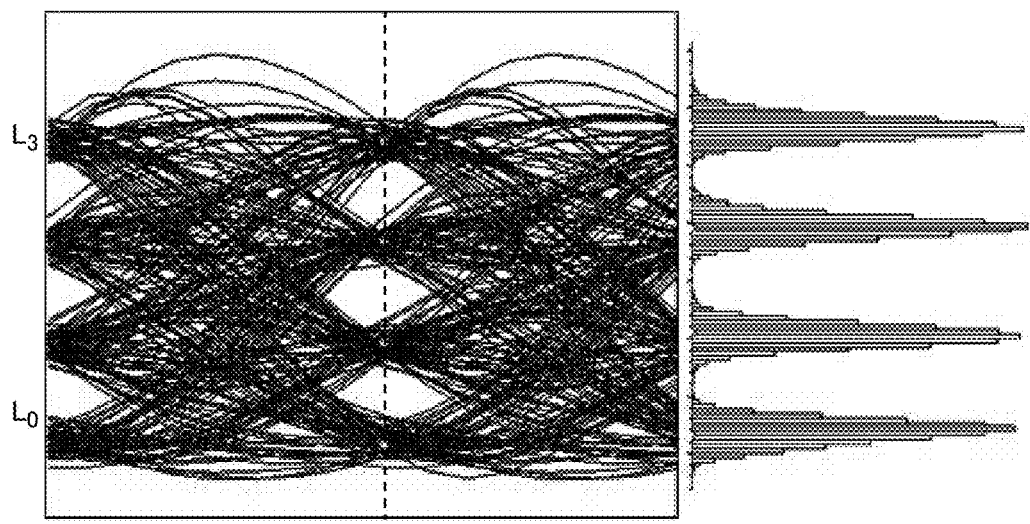
FIG. 5 is an example of how the optical signal is received by the optical receiver according to the embodiment of the present invention.

FIG. 4 is an example of how the optical signal is received when the delay is not caused by the second delay circuit 131. FIG. 5 is an example of how the optical signal is received by the optical receiver 120 according to the embodiment of the present invention. In FIG. 4 and FIG. 5, an eye pattern of the optical signal having an extinction ratio of 10.8 dB is illustrated on the left part, and a histogram at a waveform center time is illustrated on the right part. As illustrated in FIG. 4, when the delay is not caused by the second delay circuit 131, the eye pattern exhibits a large waveform distortion, and the histogram at the waveform center time also exhibits vagueness in separation of four optical signal levels. In contrast, as illustrated in FIG. 5, in the eye pattern of the optical signal received by the optical receiver 120 according to the embodiment of the present invention, timings of three eye apertures vertically arranged are substantially the same, and opening degrees of the three eye apertures are substantially equal. The histogram of the waveform center time also exhibits satisfactory separation of the four optical signal levels.

Figure 6:
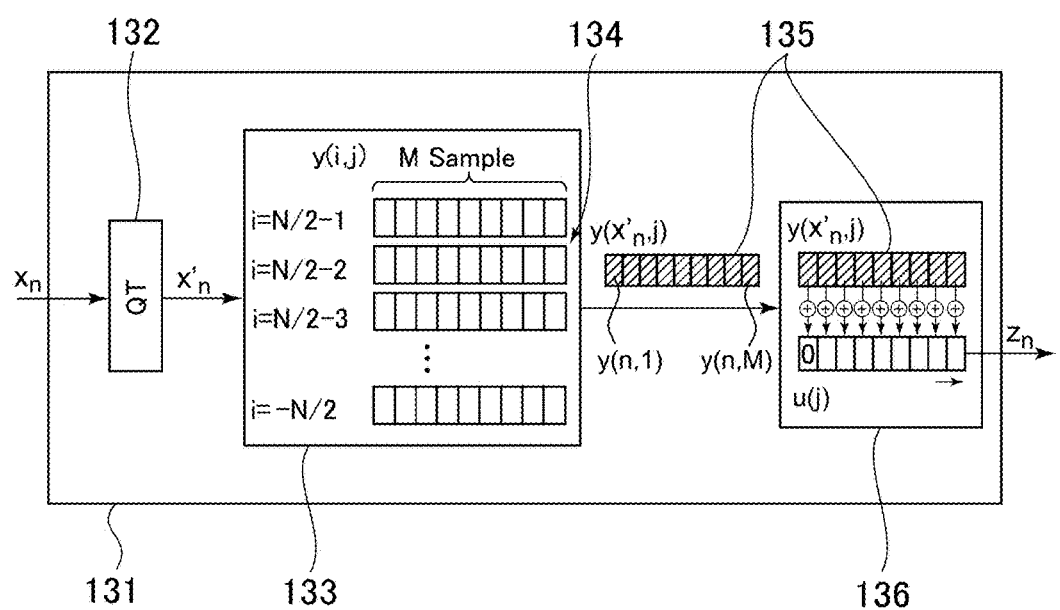
FIG. 6 is a functional block diagram of the second delay circuit according to the embodiment of the present invention.

FIG. 6 is a functional block diagram of the second delay circuit 131 according to the embodiment of the present invention. The second delay circuit 131 includes a quantization circuit 132, a second response waveform output unit 133, and a second delay and add circuit 136. The second response waveform output unit 133 is configured to output a response waveform with a waveform corresponding to the amplitude level of the input second digital signal. The second delay and add circuit 136 is configured to successively delay-add a plurality of second response waveforms continuously output from the second response waveform output unit 133.

The quantization circuit 132 is configured to quantize the amplitude level of a second multi-level digital signal Xn (n: sample number) into N levels (in this example, N integer values of from −N/2 to N/2−1), and to output a signal X'n. The signal X'n is input to the second response waveform output unit 133. The second response waveform output unit 133 includes a response waveform look-up table 134. The response waveform look-up table 134 stores N response waveforms (y(i, j); i ranges from 1 to N and j ranges from 1 to M) each having a length of M samples. The second response waveform output unit 133 is configured to output a second response waveform y (X'n, j) (j ranges from 1 to M) having a length of M samples based on the value of the signal X'n. The second response waveforms are input to the second delay and add circuit 136, and are successively added to a successively-added waveform u(j)(j ranges from 1 to M) corresponding to the last M samples stored in the second delay and add circuit 136. The successively-added waveform u(j) is shifted to the right in order, and a component at the right end is output as an output signal Zn. That is, the second delay and add circuit 136 is configured to calculate u(1)=0 for j=1, u(j+1)=u(j)+y(X'n, j) for j ranging from 1 to M−1, and Zn=u(M)+y(X'n,M) for j=M.

When a quantization level N used by the quantization circuit 132 is set to a small value, it is possible to reduce the number of indices of the response waveform look-up table 134 and to reduce a storage capacity or a circuit scale, but there is a fear that waveform compensation accuracy may not be sufficiently enhanced. Hence, the value of the quantization level N needs to be designed to an appropriate value based on trade-off between the above-mentioned aspects. The quantization circuit 132 can also be achieved by the rounding down of a less significant bit of amplitude information on the second multi-level digital signal, or the quantization circuit 132 can be omitted.

When the input second digital signal Xn is delayed by the second delay circuit 131 by the delay time linearly depending on the amplitude level of the second digital signal Xn, it suffices that the response waveform look-up table 134 contains a waveform obtained by time-sampling $y(i)=IDFT[i \times \exp(-\sqrt{-1} \times 2\pi(iT))]$ into M. In this case, IDFT represents a discrete inverse Fourier transform, and $\sqrt{-1}$ is an imaginary unit. The delay time of the thus-obtained waveform is $NT/2-1$ at a maximum amplitude value and $-NT/2$ at a minimum amplitude value.

Figure 7:
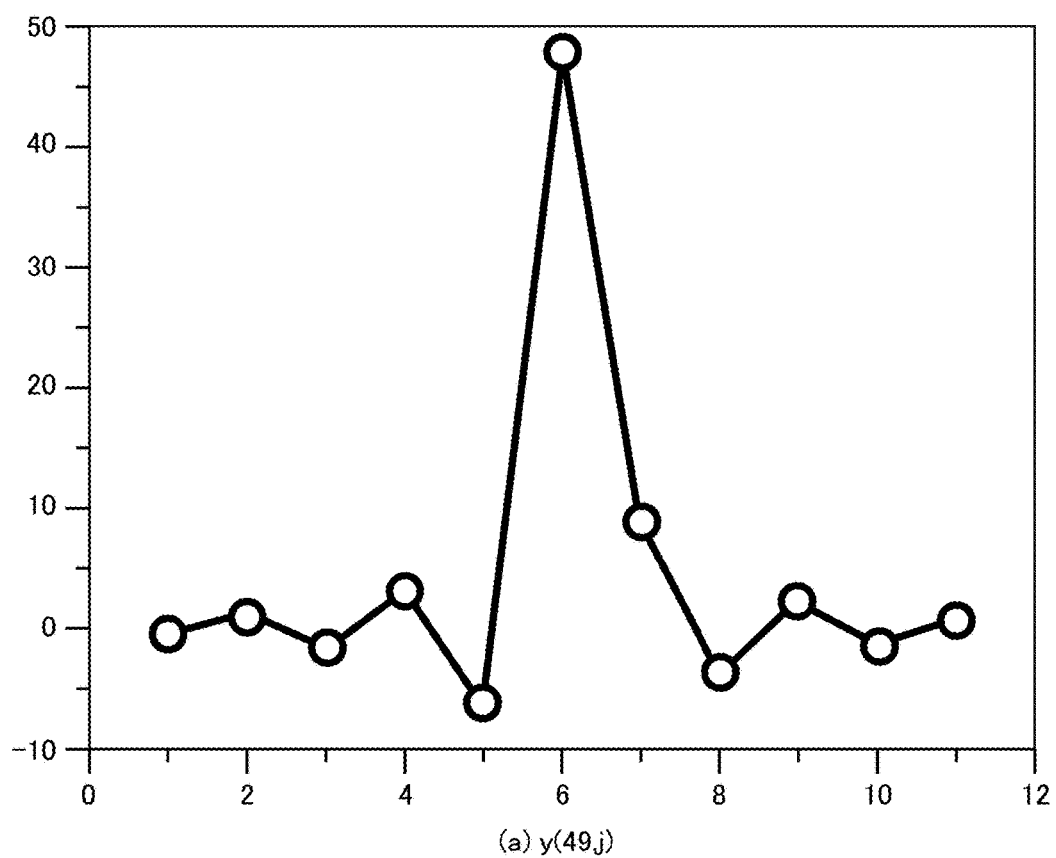
FIG. 7 is a first example of a response waveform contained in a response waveform look-up table.
Figure 8:
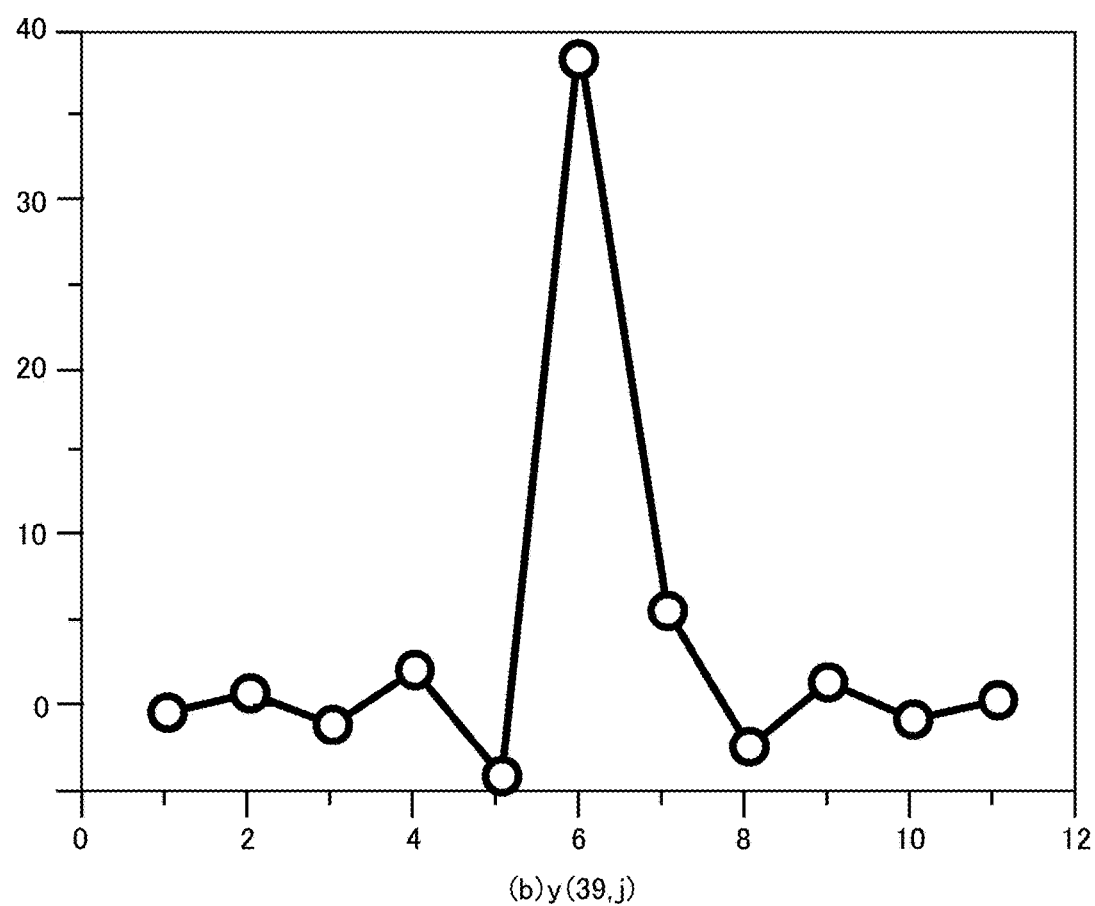
FIG. 8 is a second example of the response waveform contained in the response waveform look-up table.
Figure 9:
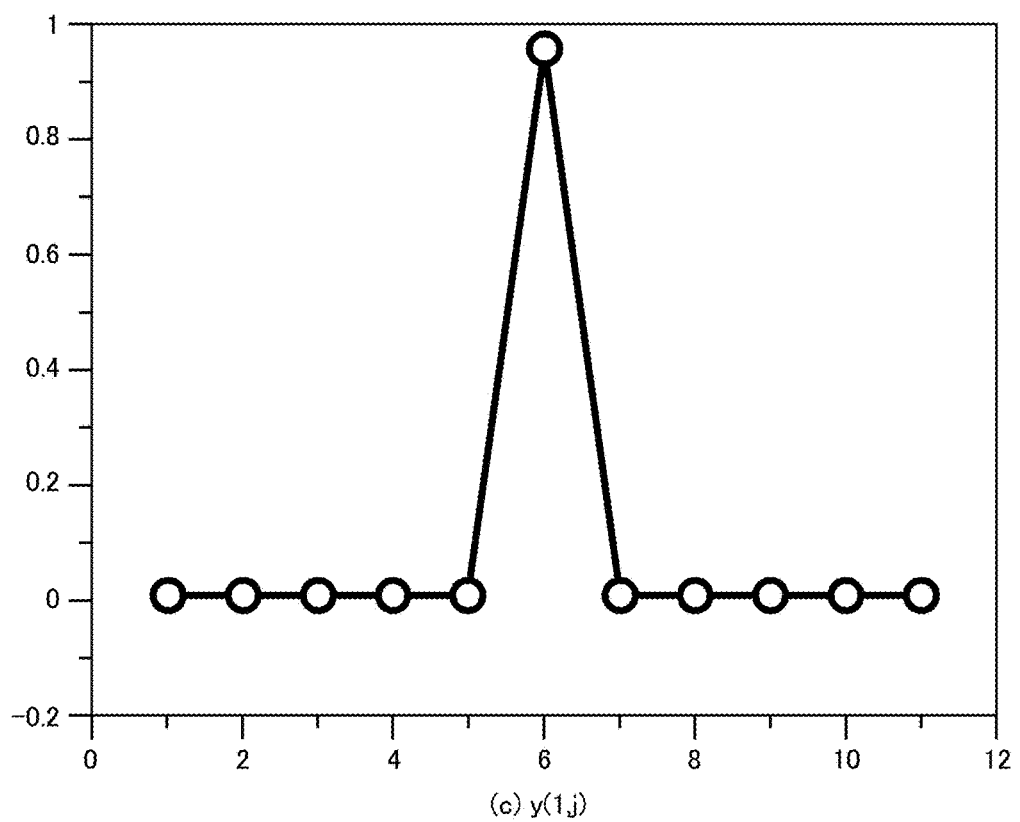
FIG. 9 is a third example of the response waveform contained in the response waveform look-up table.

FIG. 7 is a first example of the response waveform contained in the response waveform look-up table 134. FIG. 8 is a second example of the response waveform contained in the response waveform look-up table 134. FIG. 9 is a third example of the response waveform contained in the response waveform look-up table 134. In the examples of the response waveform shown in FIG. 7 to FIG. 9, the length is 11 samples (j ranges from 1 to 11), and the quantization level N is 128 (i ranges from −64 to 63). FIG. 7 is the example for showing the response waveform output when the amplitude level is large (i=49). FIG. 8 is the example for showing the response waveform output when the amplitude level is a little large (i=39).

FIG. 9 is the example for showing the response waveform output when the amplitude level is substantially medium (i=1). A response waveform (not shown) output when the amplitude level is small (i=−49) is obtained by inverting the waveform shown in FIG. 7 with respect to j=6, and the response waveform output when the amplitude level is a little small (i=−39) is obtained by inverting the waveform shown in FIG. 8 with respect to j=6.

As shown in FIG. 9, the response waveform output when the amplitude level is substantially medium (i=1) is close to an impulse response waveform having a height of one, and the delay time is substantially zero. Meanwhile, as shown in FIG. 7 and FIG. 8, the response waveform output when the amplitude level is large (i=49) and the response waveform output when the amplitude level is a little large (i=39) are each an impulse response waveform having a distortion added so as to become a delay time proportional to the amplitude level.

In this embodiment, the amplitude level of the second multi-level digital signal Xn is set within a value range of from $-N/2$ to $N/2-1$ with zero being used as a center value, but the center value and the value range may be set to any value and any range. Further, the delay time is selected so as to become substantially zero when the amplitude level is zero, but any fixed value may be added to the delay time. Further, the response waveforms contained in the response waveform look-up table 134 are not limited to a delta function and its delay, but a response function of any shape and its delay can be used. For example, a correction effect for frequency characteristics can also be produced through use of the inverse function of the response function of a part of the optical transceiver 10.

Figure 10:
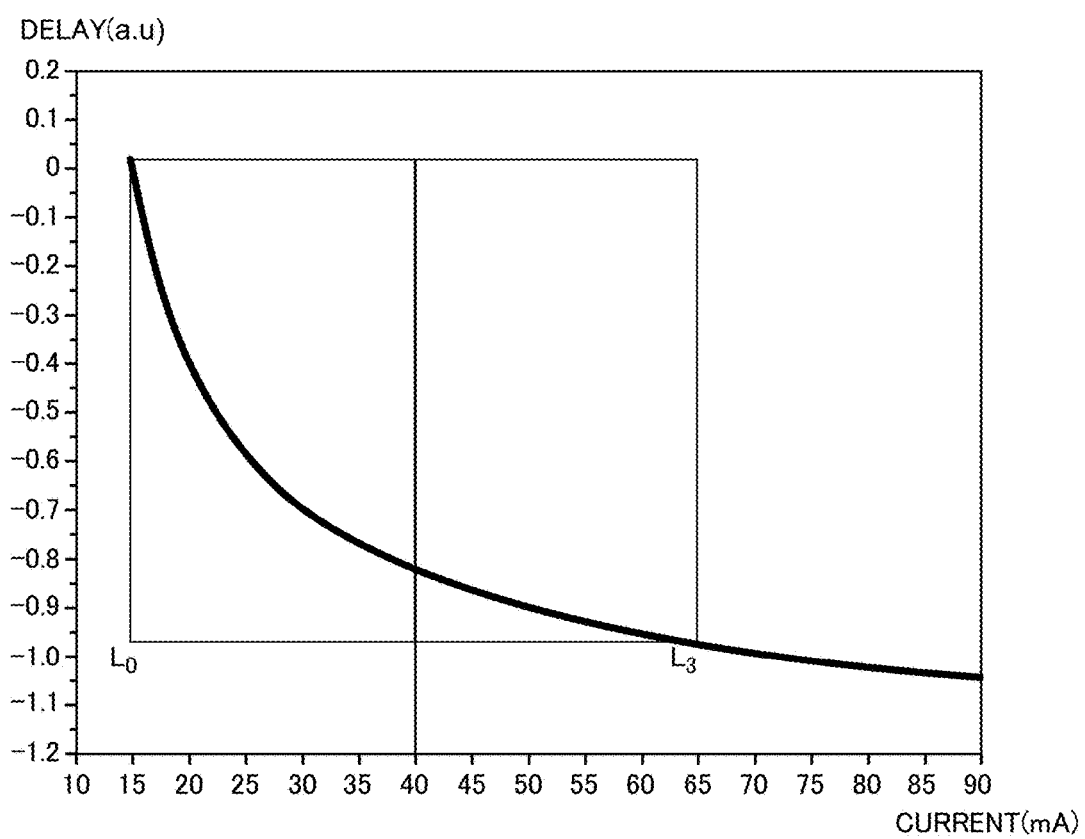
FIG. 10 is an example of a delay time determined based on a relaxation oscillation frequency of a semiconductor laser.

FIG. 10 is an example of the delay time determined based on a relaxation oscillation frequency of the semiconductor laser. In FIG. 10, the vertical axis indicates the delay time, and the horizontal axis indicates a modulated current value I of the semiconductor laser. When the input second digital signal Xn is delayed, by the second delay circuit 131, by a delay time non-linearly depending on the amplitude level of the second digital signal Xn, the delay time shown in FIG. 10 can be employed. In this case, the second delay circuit 131 delays the input second digital signal Xn by a delay time proportional to a reciprocal of the relaxation oscillation frequency of the semiconductor laser based on the amplitude level of the second digital signal Xn.

A response time of a direct-modulation semiconductor laser non-linearly changes depending on the modulated current value I of a laser. A response delay T of the semiconductor laser is represented approximately as $T=1/Fr=C/\sqrt{(I/Ith-1)}$ through use of the reciprocal of a relaxation oscillation frequency Fr of the semiconductor laser. In this case, C represents a delay constant, I represents a laser modulated current, and Ith represents a laser threshold current. When the input second digital signal Xn is delayed, by the second delay circuit 131, by the delay time proportional to the reciprocal of the relaxation oscillation frequency of the semiconductor laser based on the amplitude level of the second digital signal Xn, it suffices that the response waveform look-up table 134 contains an impulse response function of the delay time shown in FIG. 10. That is, when a bias current Ib=40 mA with the modulated current having an amplitude of ±25 mA, the delay time is set to zero at the lowest amplitude level L0, and the delay time is set to about −1.0 at the highest amplitude level L3.

Figure 11:
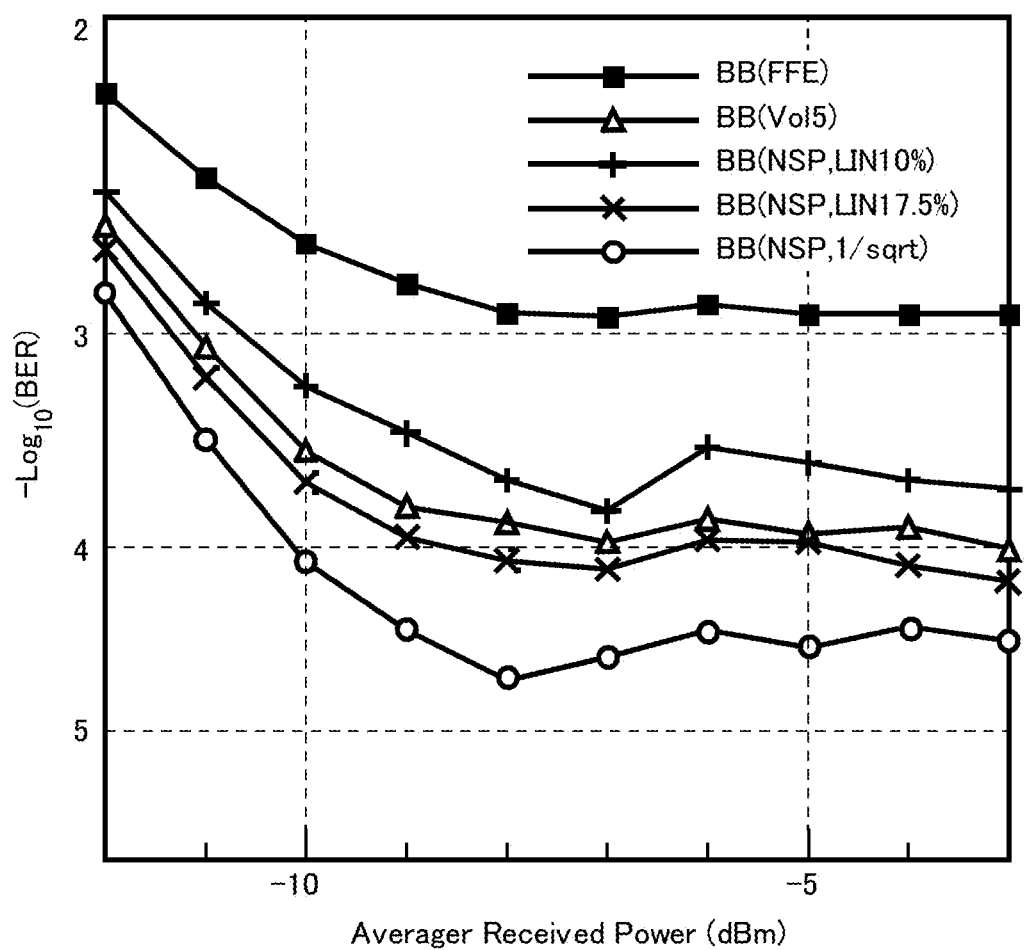
FIG. 11 is a graph for showing a relationship between an average received power and a bit error ratio of the optical signal.

FIG. 11 is a graph for showing a relationship between an average received power and a bit error ratio of the optical signal. In FIG. 11, the vertical axis indicates a logarithmic value of the bit error ratio, and the horizontal axis indicates the average received power of received optical signals. It is known that, in a case where a transmission waveform deteriorates due to extinction degradation, such a phenomenon called "error floor" occurs that the bit error ratio is not lowered to a fixed value or smaller even when the average received power is increased. When an error ratio of the error floor is so high as to exceed a correction threshold value for an error correction circuit inside the receiver, the error correction becomes impossible, and the signal cannot be transmitted. Such a correction threshold value for the error correction circuit is set to, for example, $2 \times 10^{-4}$ in 400 Gigabit Ethernet standard specifications by IEEE, which is a representative of a next-generation standard for high-speed transmission.

In FIG. 11, a relationship between the average received power and the bit error ratio of the optical signal that is not particularly corrected (that is not delayed by the second delay circuit 131) is indicated by the black solid square plot points. In a case where the delay is not caused by the second delay circuit 131, the bit error ratio is about $10^{-3}$ when the average received power ranges from −3 dBm to −8 dBm, and as the average received power increases from −9 dBm to −12 dBm, the bit error ratio becomes as worse as about $8\times10^{-3}$.

In FIG. 11, an example obtained when a received waveform is corrected by the non-linear adaptive Volterra equalizer is indicated by the outlined triangle plot points as a comparative example. In the comparative example, the bit error ratio is improved to from about $4\times10^{-3}$ to about $10^{-4}$ when the average received power ranges from −3 dBm to −10 dBm.

In FIG. 11, as a relationship between the average received power and the bit error ratio of the optical signal received by the optical receiver 120 according to this embodiment, an example in which the delay time is 10% and an example in which the delay time is 17.5% when the delay is caused by the delay time linearly depending on the amplitude level of the second digital signal are indicated by the plus-sign plot points and the cross-mark plot points, respectively. In addition, an example in which the delay is caused by the delay time non-linearly depending on the amplitude level of the second digital signal and the delay is further caused by the delay time proportional to the reciprocal of the relaxation oscillation frequency of the semiconductor laser based on the amplitude level of the second digital signal is indicated by the outlined circle plot points.

In the case where the delay is caused by setting the delay time linearly depending on the amplitude level of the second digital signal to 10% (in the case of the plus-sign plot points in FIG. 11), the bit error ratio is improved to from about $8\times10^{-4}$ to about $3\times10^4$ when the average received power ranges from −3 dBm to −10 dBm. In the case where the delay is caused by setting the delay time linearly depending on the amplitude level of the second digital signal to 17.5% (in the case of the cross-mark plot points in FIG. 11), the bit error ratio is improved to from about $3\times10^{-4}$ to about $9\times10^{-5}$ when the average received power ranges from −3 dBm to −10 dBm. As shown in FIG. 11, with the optical receiver 120 according to this embodiment, the delay is caused by the second delay circuit 131, to thereby improve the bit error ratio by about one digit than in the case where the delay is not caused by the second delay circuit 131. Further, the delay time linearly depending on the amplitude level of the second digital signal is appropriately selected, to thereby be able to obtain a more satisfactory bit error ratio than in a case of using the non-linear adaptive Volterra equalizer that requires a large-scale correction circuit. In addition, the error floor is about $9\times10^{-5}$, which falls below the above-mentioned error correction threshold value, and it is possible to achieve normal information transmission.

In the case where the delay is caused by the delay time proportional to the reciprocal of the relaxation oscillation frequency of the semiconductor laser based on the amplitude level of the second digital signal, the bit error ratio is improved to from about $10^{-4}$ to about $2\times10^{-5}$ when the average received power ranges from −3 dBm to −10 dBm. With the optical receiver 120 according to this embodiment, the delay is caused, by the second delay circuit 131, by the delay time proportional to the reciprocal of the relaxation oscillation frequency of the semiconductor laser, to thereby improve the bit error ratio by two digits or more than in the case where the delay is not caused by the second delay circuit 131. Even compared with the case of using the non-linear adaptive Volterra equalizer that requires a large-scale correction circuit, the bit error ratio is improved to a level of about ¼.

The second delay circuit 131 according to this embodiment is configured to digitally correct only a delay in a phase direction among non-linear waveform distortions ascribable to direct modulation of the semiconductor laser, and is capable of conducting waveform compensation lighter in calculation load and higher in accuracy with a simpler and more inexpensive circuit configuration that causes no problem with convergence property or stability than in the non-linear adaptive Volterra equalizer or other such related art.

In this embodiment, a case of employing a pulse-amplitude modulation 4 (PAM4) signal as a multi-level light intensity signal is described, but the kind of multi-level modulation or the coding method may be different. For example, there may be employed an octal level (PAM8), a hexadecimal level (PAM16), or other such higher-order PAM signal, a partial-response multi-level intensity signal that allows intersymbol interference between successive multi-level symbols, or a higher-order multi-level light intensity signal that combines trellis coding. This is because the second delay circuit 131 according to this embodiment is configured to cause a waveform delay corresponding to the amplitude level of the optical signal, and can thus be applied irrespective of the kind of the multi-level signal. As a kind of the multi-level signal, there may also be employed multi-level Nyquist modulation for achieving a narrower band of the multi-level signal through use of a Nyquist filter having a narrow band. The multi-level Nyquist modulation has a characteristic of exhibiting large peaking of an amplitude above and below the multi-level signal near a symbol boundary, but can be handled by the second delay circuit 131 according to this embodiment in the similar manner as another multi-level signal when a waveform delay corresponding to an actual modulated current including the peaking of the waveform is added. The similar applies to subcarrier modulation exhibiting the similar peaking as that of the multi-level Nyquist modulation, discrete multi-tone (DMT) modulation being a kind thereof, and the like.

Figure 12:
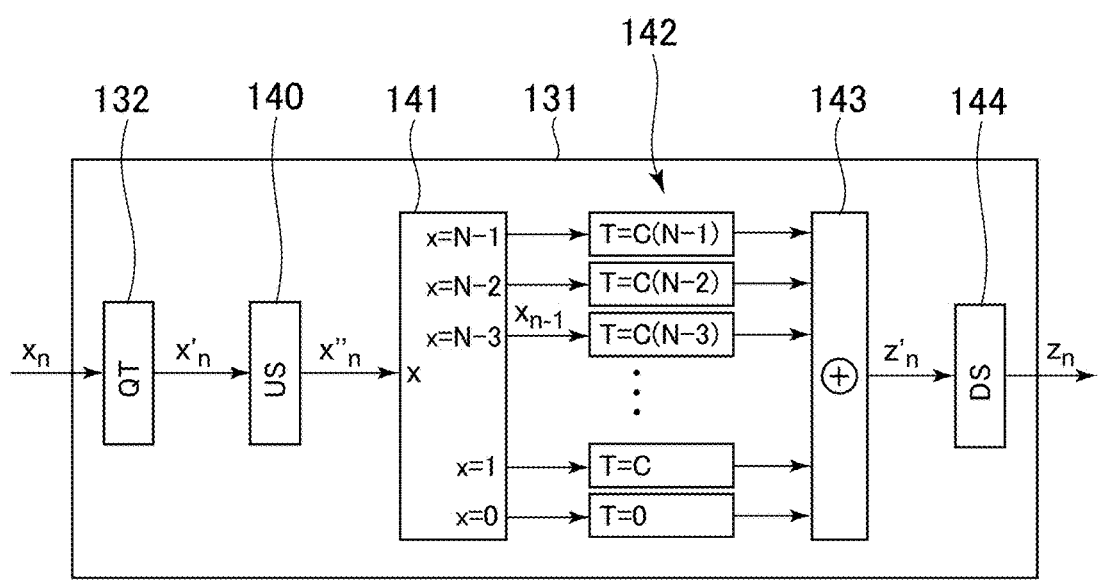
FIG. 12 is a functional block diagram of a second delay circuit according to a modification example of the embodiment of the present invention.

FIG. 12 is a functional block diagram of the second delay circuit 131 according to a modification example of the embodiment of the present invention. The second delay circuit 131 according to the modification example is different from the second delay circuit 131 illustrated in FIG. 6 in that the second delay circuit 131 according to the modification example includes an upsampler 140, an amplitude selector circuit 141, individual delay circuits 142, an adder 143, and a downsampler 144. The second delay circuit 131 according to the modification example has the similar configuration as that of the second delay circuit 131 illustrated in FIG. 6 in that both include the quantization circuit 132.

The quantization circuit 132 is configured to quantize the amplitude level of the second multi-level digital signal Xn (n: sample number) into N levels (in this example, N integer values of from −N/2 to N/2−1), and to output the signal X'n to the upsampler 140. The upsampler 140 is configured to insert a fixed number of zero signals between samples, to increase a time resolution of the waveform, and to output a signal X"n to the amplitude selector circuit 141. The amplitude selector circuit 141 is configured to output the input signal X"n to the individual delay circuits 142 based on amplitude values (in this example, from 0 to N−1) of an N-level signal X"n. The individual delay circuits 142 are each configured to output the input signal to the adder 143 after adding a delay time corresponding to the amplitude level of the input signal to the input signal. The adder 143 is configured to add up signals delayed by the individual delay circuits 142, and to output a signal Z'n to the downsampler 144. The downsampler 144 is configured to return the signal Z'n to the waveform for an original sampling rate, and to output the signal Zn.

The individual delay circuits 142 may be configured to delay the input signal by the delay time linearly depending on the amplitude level of the signal, or may be configured to delay the input signal by the delay time non-linearly depending on the amplitude level of the signal. The individual delay circuits 142 may also be configured to delay the input signal by the delay time proportional to the reciprocal of the relaxation oscillation frequency of the semiconductor laser based on the amplitude level of the signal. Even when such a configuration is employed, it is possible to obtain a satisfactory relationship between the average received power and the bit error ratio shown in FIG. 11.

The individual delay circuit 142 according to the modification example is a circuit configured to cause only a simple data delay, and is advantageous in that the individual delay circuit 142 according to the modification example can be implemented by a shift register or other such simple circuit. An amount of data to be processed by the upsampler 140 increases depending on the quantization level N, but most of the data has a zero value, and hence a substantial circuit scale is not increased through processing conducted only on non-zero sample value.

Figure 13:
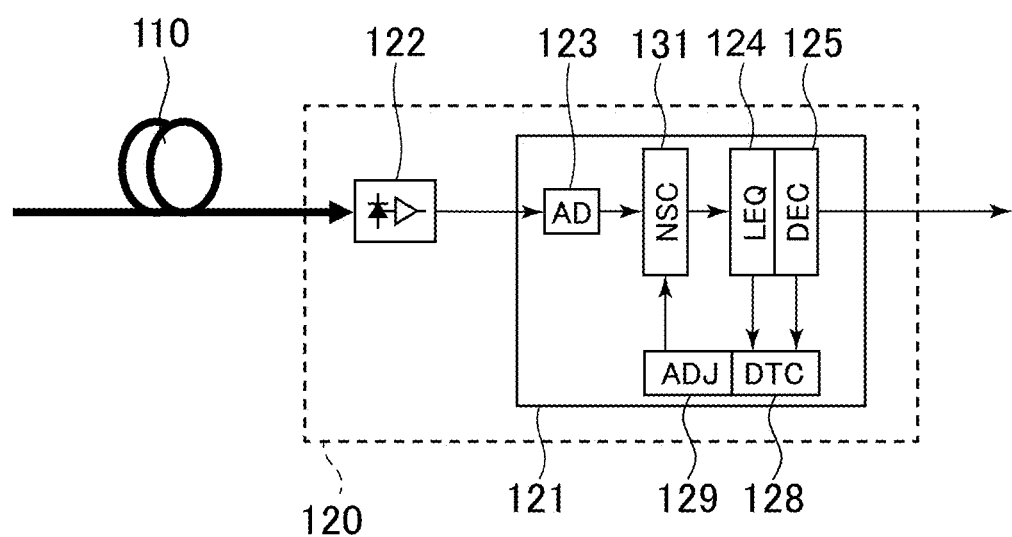
FIG. 13 is a functional block diagram of an optical receiver according to the modification example of the embodiment of the present invention.

FIG. 13 is a functional block diagram of the optical receiver 120 according to the modification example of the embodiment of the present invention. The optical receiver 120 according to the modification example includes an error ratio detection unit 128 and a delay time correction unit 129 in addition to the configuration of the optical receiver 120 illustrated in FIG. 2. The error ratio detection unit 128 is configured to detect the error ratio of the second information signal output from the multi-level decoder 125. The delay time correction unit 129 is configured to correct the delay time of the second delay circuit 131 based on the error ratio detected by the error ratio detection unit 128. The error ratio detection unit 128 may be configured to detect a waveform error of the second multi-level digital signal output from the receiving-side linear equalizer 124.

The delay time correction unit 129 is configured to correct the delay time of the second delay circuit 131 so that the error ratio detected by the error ratio detection unit 128 becomes smaller. The delay time correction unit 129 is configured to correct the response waveform of the response waveform look-up table 134 or to correct the delay time of the individual delay circuits 142, to thereby correct the delay time of the second delay circuit 131. The error ratio detection unit 128 and the delay time correction unit 129 are included, and hence an optimal delay time is constantly set to maintain the error ratio to a small level.

Figure 14:
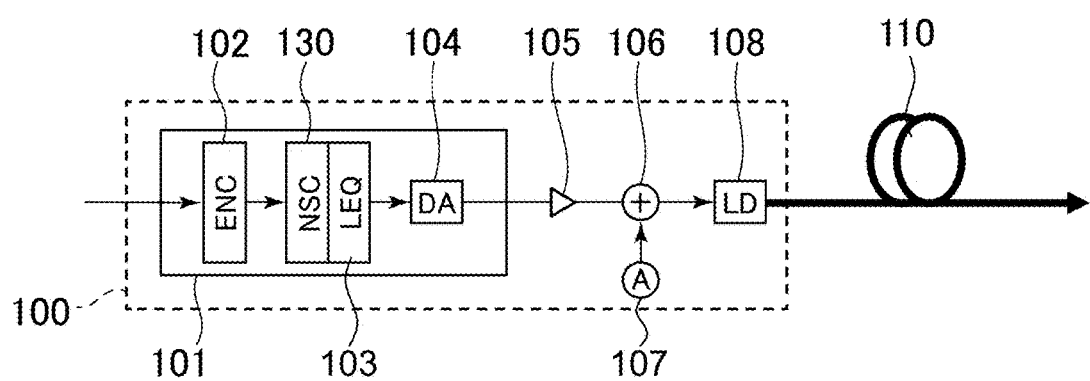
FIG. 14 is a functional block diagram of an optical transmitter according to the embodiment of the present invention.

FIG. 14 is a functional block diagram of the optical transmitter 100 according to the embodiment of the present invention. The optical transmitter 100 includes the optical transmitter IC 101 configured to output the first electric signal based on the input first information signal, a laser current driver 105, a bias current adder 106, a bias current source 107, and the semiconductor laser 108 configured to output the optical signal having a modulated light intensity to the optical fiber 110. The laser current driver 105 is configured to output a modulated current based on the first electric signal output from the optical transmitter IC 101. The bias current adder 106 is configured to add the bias current output from the bias current source 107 to the modulated current. The bias current is, for example, 40 mA, and the modulated current may be set to ±25 mA.

The optical transmitter IC 101 includes a multi-level encoder 102 configured to output the first multi-level digital signal based on the input first information signal, the first delay circuit 130 configured to delay the input first multi-level digital signal by the delay time corresponding to the amplitude level of the first multi-level digital signal, and a digital-to-analog (DA) converter 104 configured to convert the first multi-level digital signal delayed by the first delay circuit 130 into the first electric signal. The optical transmitter IC 101 further includes a transmitting-side linear equalizer 103. The transmitting-side linear equalizer 103 is configured to correct the linear deterioration ascribable to the high-frequency component for the first multi-level digital signal delayed by the first delay circuit 130, and to output the corrected first multi-level digital signal to the DA converter 104.

As the configuration of the first delay circuit 130, the configuration of the second delay circuit 131 illustrated in FIG. 6 can be employed as it is. That is, the first delay circuit 130 may include a first response waveform output unit (corresponding to the second response waveform output unit 133 of FIG. 6) configured to output a response waveform with a waveform corresponding to the amplitude level of the input first digital signal, and a first delay and add circuit (corresponding to the second delay and add circuit 136 of FIG. 6) configured to successively delay-add a plurality of first response waveforms continuously output from the first response waveform output unit. In addition, as another configuration of the first delay circuit 130, the configuration of the second delay circuit 131 according to the modification example illustrated in FIG. 12 may be employed as it is.

In the first delay circuit 130, an input signal Xn is the first multi-level digital signal, and the output signal Zn is input to the transmitting-side linear equalizer 103. The first delay circuit 130 may be configured to delay the input first digital signal by the delay time linearly depending on the amplitude level of the first digital signal. Further, the first delay circuit 130 may be configured to delay the input first digital signal by the delay time non-linearly depending on the amplitude level of the first digital signal, or may be configured to delay the input first digital signal by the delay time proportional to the reciprocal of the relaxation oscillation frequency of the semiconductor laser 108 based on the amplitude level of the first digital signal.

The optical transmitter IC 101 according to this embodiment includes the first delay circuit 130, which reduces the number of levels of the input signal Xn to a much smaller number than that of the optical receiver IC 121 including the second delay circuit 131, to thereby be able to reduce the circuit scale. The number of levels of a PAM4 signal is 4 in a case of signal processing at 1 sample/symbol and is 7 in a case of signal processing at 2 samples/symbol, and hence the number of memories for the response waveform look-up table 134 can be reduced to 4 or 7 (that is, the amplitude level of the input signal can be set to N being 4 or 7). With this configuration, the circuit scale of the response waveform look-up table 134 included in the optical transmitter IC 101 ranges from 1/10 to 1/100 of the optical receiver IC 121, which can reduce the circuit scale and the power consumption. In the optical transmitter IC 101, the first delay circuit 130 is arranged in proximity to the semiconductor laser 108, and hence more accurate delay characteristics can also be set for the first delay circuit 130 based on the extinction ratio or other such characteristics of an individual laser. Improvement in loss tolerance (tolerance to loss) and extension of a transmission distance can thus be achieved by virtue of improvement in correction accuracy.

Figure 15:
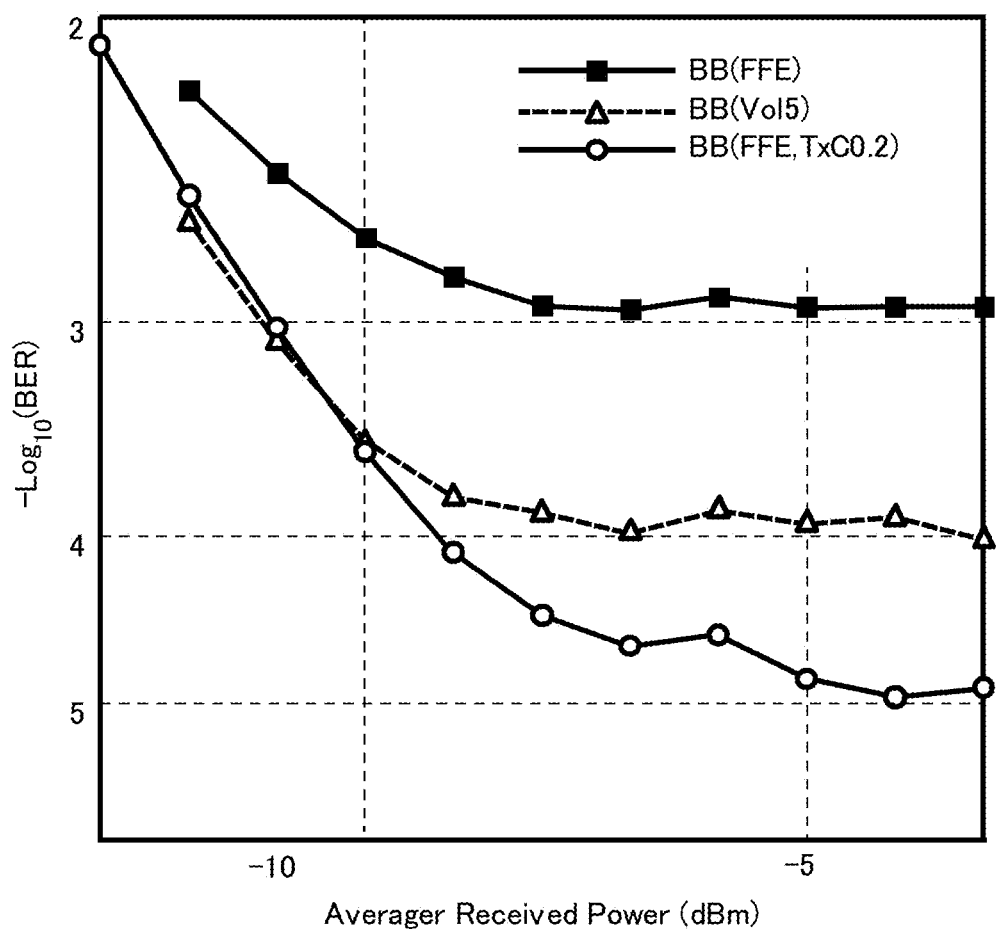
FIG. 15 is a graph for showing a relationship between the average received power and the bit error ratio of the optical signal.

FIG. 15 is a graph for showing a relationship between the average received power and the bit error ratio of the optical signal. In FIG. 15, the vertical axis indicates a logarithmic value of a bit error ratio, and the horizontal axis indicates an average received power of optical signals. In FIG. 15, a relationship between the average received power and the bit error ratio of the optical signal that is not particularly corrected (that is not delayed by the first delay circuit 130) is indicated by the black solid square plot points. In a case where the delay is not caused by the first delay circuit 130, when the average received power ranges from −3 dBm to −8 dBm, the bit error ratio becomes as worse as about $1\times10^{-3}$ to $3\times10^{-3}$.

In FIG. 15, an example obtained when a received waveform is corrected by the non-linear adaptive Volterra equalizer in the optical receiver is indicated by the outlined triangle plot points as a comparative example. In the comparative example, the bit error ratio is improved to from about $4\times10^{-3}$ to about $10^{-4}$ when the average received power ranges from −3 dBm to −10 dBm.

In FIG. 15, as a relationship between the average received power and the bit error ratio of the optical signal transmitted by the optical transmitter 100 according to this embodiment, an example in which the delay is caused by the delay time non-linearly depending on the amplitude level of the second digital signal and the delay is further caused by the delay time proportional to the reciprocal of the relaxation oscillation frequency of the semiconductor laser 108 based on the amplitude level of the second digital signal is indicated by the outlined circle plot points.

In the case where the delay is caused by the delay time proportional to the reciprocal of the relaxation oscillation frequency of the semiconductor laser 108 based on the amplitude level of the first digital signal (in the case of the outlined circle plot points in FIG. 15), the bit error ratio is improved to from about $4\times10^{-4}$ to about $10^{-5}$ when the average received power ranges from −3 dBm to −10 dBm. With the optical receiver 120 according to this embodiment, the delay is caused, by the first delay circuit 130, by the delay time proportional to the reciprocal of the relaxation oscillation frequency of the semiconductor laser 108, to thereby improve the bit error ratio by two digits or more than in the case where the delay is not caused by the first delay circuit 130. Even compared with the case of using the non-linear adaptive Volterra equalizer that requires a large-scale correction circuit, the bit error ratio is improved to a level of about ¼. The error floor exhibited when the delay is caused by the delay time proportional to the reciprocal of the relaxation oscillation frequency of the semiconductor laser 108 based on the amplitude level of the first digital signal is about $1\times10^{-5}$, which sufficiently falls below the above-mentioned error correction threshold value, and it is possible to achieve normal information transmission.

The first delay circuit 130 according to this embodiment is configured to digitally correct only the delay in the phase direction among the non-linear waveform distortions ascribable to the direct modulation of the semiconductor laser 108, and is capable of conducting the waveform compensation lighter in calculation load and higher in accuracy with a simpler and more inexpensive configuration that causes no problem with convergence property or stability than in the non-linear adaptive Volterra equalizer or other such related art. In addition, the first delay circuit 130 according to this embodiment is provided to the optical transmitter 100, and can be applied to a component other than the optical receiver unlike the non-linear adaptive Volterra equalizer.

Figure 16:
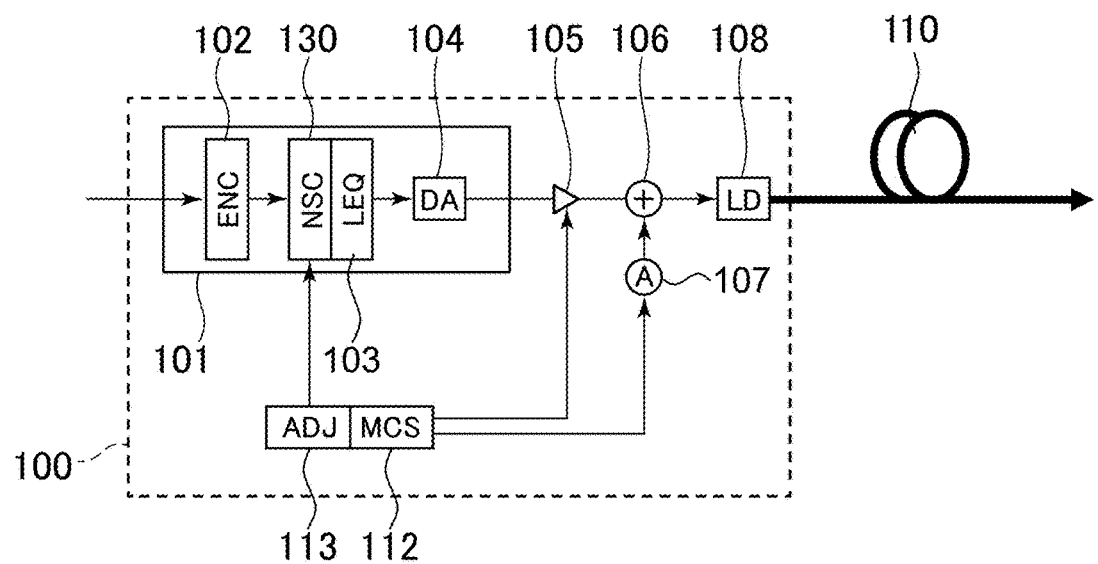
FIG. 16 is a functional block diagram of an optical transmitter according to the modification example of the embodiment of the present invention.

FIG. 16 is a functional block diagram of the optical transmitter 100 according to the modification example of the embodiment of the present invention. The optical transmitter 100 according to the modification example further includes a modulation condition setting unit 112 configured to set a modulation condition for the semiconductor laser 108 and a delay time correction unit 113 configured to correct the delay time of the first delay circuit 130 based on the modulation condition in addition to the configuration of the optical transmitter 100 illustrated in FIG. 14.

When the modulation condition for the semiconductor laser 108 is changed, the waveform of the optical signal changes, and hence the delay time correction unit 113 conducts adjustment so that precise waveform compensation is constantly conducted based on the modulation condition for the semiconductor laser 108. The modulation condition for the semiconductor laser 108 is defined based on a bias current value and a modulation amplitude, and the delay time correction unit 113 may use the threshold current, the extinction ratio, or other such parameter of the semiconductor laser 108 in addition to the above-mentioned values. The delay time of the first delay circuit 130 may also be corrected based on a chip temperature of the semiconductor laser 108 in consideration of a change in relaxation oscillation frequency due to a temperature of the semiconductor laser 108.

Figure 17:
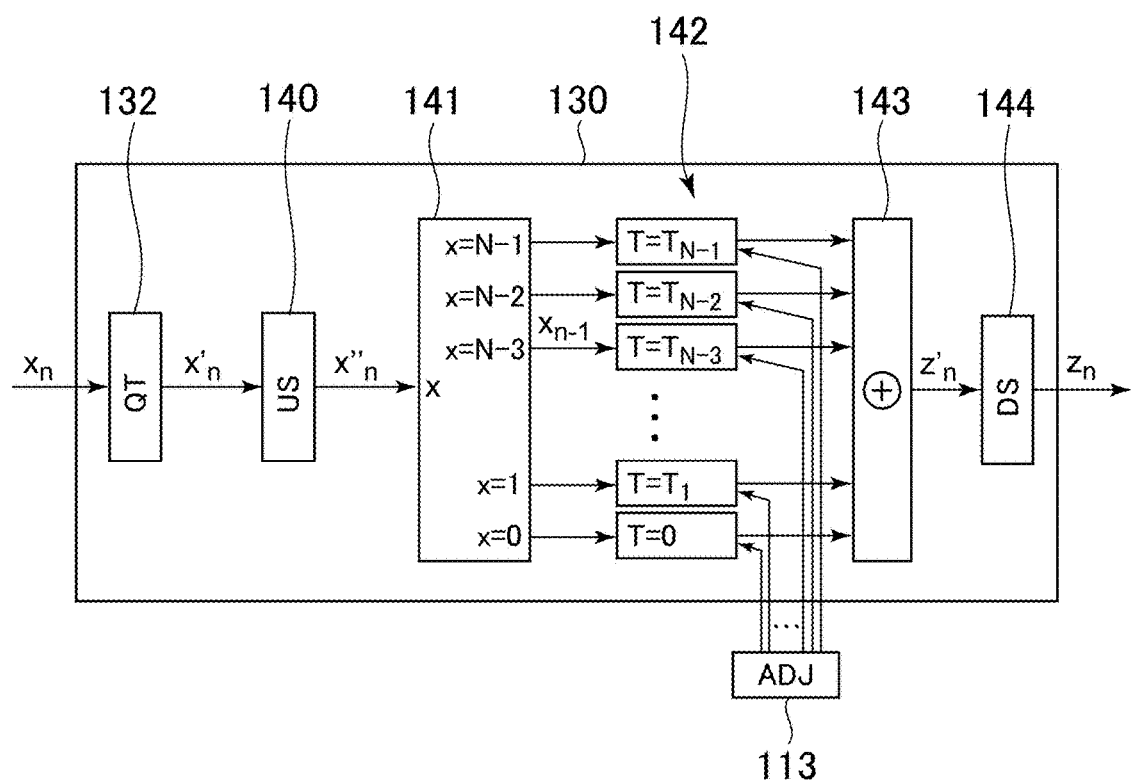
FIG. 17 is a functional block diagram of a first delay circuit according to the modification example of the embodiment of the present invention.

FIG. 17 is a functional block diagram of the first delay circuit 130 according to the modification example of the embodiment of the present invention. The first delay circuit 130 according to the modification example includes the quantization circuit 132, the upsampler 140, the amplitude selector circuit 141, the individual delay circuits 142, the adder 143, and the downsampler 144, and signals are input from the delay time correction unit 113 to the individual delay circuits 142.

The quantization circuit 132 is configured to quantize the amplitude level of the first multi-level digital signal Xn (n: sample number) into N levels (in this example, N integer values of from −N/2 to N/2−1), and to output the signal X'n to the upsampler 140. The upsampler 140 is configured to insert a fixed number of zero signals between samples, to increase a time resolution of the waveform, and to output the signal X"n to the amplitude selector circuit 141. The amplitude selector circuit 141 is configured to output the input signal X"n to the individual delay circuits 142 based on amplitude values (in this example, from 0 to N−1) of the N-level signal X"n. The individual delay circuits 142 are each configured to output the input signal to the adder 143 after adding a delay time corresponding to the amplitude level of the input signal to the input signal. The adder 143 is configured to add up signals delayed by the individual delay circuits 142, and to output the signal Z'n to the downsampler 144. The downsampler 144 is configured to return the signal Z'n to the waveform for an original sampling rate, and to output the signal Zn.

The individual delay circuits 142 may be configured to delay the input signal by the delay time linearly depending on the amplitude level of the signal, or may be configured to delay the input signal by the delay time non-linearly depending on the amplitude level of the signal. The individual delay circuits 142 may also be configured to delay the input signal by the delay time proportional to the reciprocal of the relaxation oscillation frequency of the semiconductor laser based on the amplitude level of the signal. The individual delay circuit 142 is also configured to correct the delay time based on the signal input from the delay time correction unit 113.

The individual delay circuit 142 according to the modification example is a circuit configured to cause only a simple data delay, and is advantageous in that the individual delay circuit 142 according to the modification example can be implemented by a shift register or other such simple circuit. An amount of data to be processed by the upsampler 140 increases depending on the quantization level N, but most of the data has a zero value, and hence a substantial circuit scale is not increased through processing conducted only on non-zero sample value. In addition, the delay time is constantly maintained to an optimal level by the delay time correction unit 113, which maintains the error ratio of the optical signal to a small level.

In the above, the embodiment according to the present invention is described. However, the specific configuration described in the embodiment is described as an example, and is not intended to limit the technical scope of the present invention to the embodiment. For example, in this embodiment, the optical detector 122 configured to convert the optical signal subjected to intensity modulation into an electric signal is exemplified. As the optical detector 122, an optical detector using another method can also be employed. For example, there can also be employed a pre-amplifying optical receiver including an optical amplifier using a semiconductor or a rare-earth-doped optical fiber which is arranged in a previous stage of the optical detector 122, a photo multiplexing optical receiver using an avalanche photodiode (APD), an optical delay detecting optical receiver using optical delay interference, a coherent optical receiver including a local oscillator laser which is arranged inside the receiver, or the like.

While there have been described what are at present considered to be certain embodiments of the invention, it will be understood that various modifications may be made thereto, and it is intended that the appended claims coverall such modifications as fall within the true spirit and scope of the invention.

What is claimed is:

1. An optical transceiver, comprising:
    an optical transmitter comprising:
        a multi-level encoder configured to output a first multi-level digital signal based on an input first information signal;
        a DA converter configured to convert the first multi-level digital signal into a first electric signal; and
        a semiconductor laser configured to output an optical signal having a modulated light intensity based on the first electric signal;
    an optical receiver comprising:
        an optical detector configured to receive the optical signal, and to output a second electric signal;
        an AD converter configured to convert the second electric signal into a second multi-level digital signal; and
        a multi-level decoder configured to decode the second multi-level digital signal, and to output a second information signal; and
    at least any one of:
    a first delay circuit included in the optical transmitter and configured to delay the first multi-level digital signal by a first delay time D1(X1(t)) as a function of an amplitude X1(t) of the first multi-level digital signal, the first delay time D1(X1(t)) being obtained corresponding to the amplitude X1 (t) as a function of time t; and
    a second delay circuit included in the optical receiver and configured to delay the second multi-level digital signal by a second delay time D2(X2(t)) as a function of an amplitude X2(t) of the second multi-level digital signal, the second delay time D2(X2(t)) being obtained corresponding to the amplitude X2(t) as a function of time t, wherein:
    the first delay circuit is configured to delay the first multi-level digital signal by the first delay time D1(X1(t)), the first delay time D1(X1(t)) being non-linearly dependent on the amplitude X1(t) of the first multi-level digital signal and being proportional to a reciprocal of a relaxation oscillation frequency of the semiconductor laser based on the amplitude X1(t) of the first multi-level digital signal; and
    the second delay circuit is configured to delay the second multi-level digital signal by the second delay time D2(X2(t)), the second delay time D2(X2(t)) being non-linearly dependent on the amplitude X2(t) of the second multi-level digital signal and being proportional to the reciprocal of the relaxation oscillation frequency of the semiconductor laser based on the amplitude X2(t) of the second multi-level digital signal.

2. The optical transceiver according to claim 1, wherein:
    the optical receiver comprises the second delay circuit; and
    the multi-level decoder is configured to decode the second multi-level digital signal delayed by the second delay circuit, and to output the second information signal.

3. The optical transceiver according to claim 2, wherein the optical receiver further comprises at least one microprocessor configured to:
    detect an error ratio of the second information signal output from the multi-level decoder; and
    correct the second delay time $D_2(X_2(t))$ of the second delay circuit based on the error ratio.

4. The optical transceiver according to claim 1, wherein:
    the optical transmitter comprises the first delay circuit; and
    the DA converter is configured to convert the first multi-level digital signal delayed by the first delay circuit into the first electric signal.

5. The optical transceiver according to claim 4, wherein the optical transmitter further comprises at least one microprocessor configured to:
    set a modulation condition for the semiconductor laser; and
    correct the first delay time $D_1(X_1(t))$ of the first delay circuit based on the modulation condition.

6. The optical transceiver according to claim 1, wherein:
    the first delay circuit comprises at least one first microprocessor configured to:
    output a first response waveform with a waveform corresponding to the amplitude Xi(t) of the first multi-level digital signal; and
    successively delay-add a plurality of the first response waveforms continuously output; and
    the second delay circuit comprises at least one second microprocessor configured to:
    output a second response waveform with a waveform corresponding to the amplitude X2(t) of the second multi-level digital signal; and
    successively delay-add a plurality of the second response waveforms continuously output.

* * * * *